United States Patent
Albunia et al.

(10) Patent No.: US 10,584,196 B2
(45) Date of Patent: Mar. 10, 2020

(54) PROCESS FOR PRODUCING LLDPE RESINS

(71) Applicant: BOREALIS AG, Vienna (AT)

(72) Inventors: Alexandra Romina Albunia, Linz (AT); Ravindra Tupe, Helsinki (FI); Victor Sumerin, Helsinki (FI); John Jamieson, Porvoo (FI); Jani Aho, Helsinki (FI); Markku Vahteri, Porvoo (FI); Jarmo Kela, Porvoo (FI); Renate Eckmayr, Linz (AT)

(73) Assignee: BOREALIS AG, Vienna (AT)

( * ) Notice: Subject to any disclaimer, the term of this patent is extended or adjusted under 35 U.S.C. 154(b) by 147 days.

(21) Appl. No.: 15/739,649

(22) PCT Filed: Jun. 23, 2016

(86) PCT No.: PCT/EP2016/064511
§ 371 (c)(1),
(2) Date: Dec. 22, 2017

(87) PCT Pub. No.: WO2016/207270
PCT Pub. Date: Dec. 29, 2016

(65) Prior Publication Data
US 2019/0119419 A1    Apr. 25, 2019

(30) Foreign Application Priority Data

Jun. 23, 2015  (EP) .................................... 15173364

(51) Int. Cl.
| C08F 210/16 | (2006.01) |
| C08F 110/02 | (2006.01) |
| C08F 2/00 | (2006.01) |
| C08F 2/14 | (2006.01) |
| C08F 2/34 | (2006.01) |
| C08F 4/02 | (2006.01) |
| C08L 23/08 | (2006.01) |
| C08L 23/06 | (2006.01) |

(52) U.S. Cl.
CPC ............ *C08F 210/16* (2013.01); *C08F 2/001* (2013.01); *C08F 2/14* (2013.01); *C08F 2/34* (2013.01); *C08F 4/022* (2013.01); *C08F 110/02* (2013.01); *C08L 23/06* (2013.01); *C08L 23/0815* (2013.01); *C08F 2410/01* (2013.01); *C08F 2410/05* (2013.01); *C08F 2500/08* (2013.01); *C08F 2500/12* (2013.01); *C08F 2800/20* (2013.01)

(58) Field of Classification Search
CPC ...... C08F 210/16; C08F 110/02; C08F 4/022; C08F 2/34; C08F 2/14; C08F 2/001; C08L 23/06; C08L 23/0815
See application file for complete search history.

(56) References Cited

U.S. PATENT DOCUMENTS

| 3,242,150 | A | 3/1966 | Scoggin |
| 3,324,093 | A | 6/1967 | Alleman |
| 3,374,211 | A | 3/1968 | Marwil et al. |
| 3,405,109 | A | 10/1968 | Rohlfing |
| 4,532,311 | A | 7/1985 | Fulks et al. |
| 4,543,399 | A | 9/1985 | Jenkins, III et al. |
| 4,578,879 | A | 4/1986 | Yokoyama et al. |
| 4,582,816 | A | 4/1986 | Miro |
| 4,621,952 | A | 11/1986 | Aronson |
| 4,803,251 | A | 2/1989 | Goode et al. |
| 4,855,370 | A | 8/1989 | Chirillo et al. |
| 4,933,149 | A | 6/1990 | Rhee et al. |
| 5,026,795 | A | 6/1991 | Hogan |
| 5,391,654 | A | 2/1995 | Ahvenainen et al. |
| 2018/0030179 | A1* | 2/2018 | Sumerin ............... C08F 210/16 |

FOREIGN PATENT DOCUMENTS

| EP | 0047077 A1 | 3/1982 |
| EP | 0188125 A2 | 7/1986 |
| EP | 0250169 A2 | 12/1987 |
| EP | 0361493 A1 | 4/1990 |
| EP | 0372239 A2 | 6/1990 |

(Continued)

OTHER PUBLICATIONS

Ali et al., "Optimization and Control of Industrial Gas-Phase Ethylene Polymerization Reactors," Ind. Eng. Chem. Res., 1998, 37, 3414-3423, p. 3418. (Year: 1998).*
International Search Report and Written Opinion, issued in PCT/EP2016/064511, dated Aug. 19, 2016.
Geldart et al., "The Design of Distributors for Gas-Fluidized Beds", Powder Technology, vol. 42, 1985, pp. 67-78.
Geldart, "Gas Fluidization Technology," J Wiley & Sons Ltd, 1986, pp. 156-169.
Katja Klimke, et al.; "Optimisation and Application of Polyolefin Branch Quantification by Melt-State 13C NMR Spectroscopy"; Macromolecular Chemistry and Physics; vol. 207; pp. 382-395; (2006).

(Continued)

*Primary Examiner* — Catherine S Branch
(74) *Attorney, Agent, or Firm* — Roberts Mlotkowski Safran Cole & Calderon, P.C.

(57) ABSTRACT

A process for producing copolymers of ethylene and at least one alpha-olefin having from 4 to 10 carbon atoms in the presence of a solid Ziegler-Natta catalyst comprising of magnesium, titanium, halogen and an internal organic compound, the copolymer having a density of from 906 to 937 kg/m$^3$ and a melt flow rate MFR$_{21}$ measured at 190° C. under 21.6 kg load of from 3 to 150 g/10 min. The process includes the steps of (A) homopolymerising ethylene or copolymerising ethylene and a first alpha-olefin having from 4 to 10 carbon atoms in a first polymerisation stage in the presence of the polymerisation catalyst, hydrogen and optionally the first alpha-olefin; (B) copolymerising ethylene and a second alpha-olefin having from 4 to 10 carbon atoms in a second polymerisation stage in the presence of the first homo- or copolymer of ethylene and the Ziegler-Natta catalyst; and (C) recovering the polymer mixture.

15 Claims, No Drawings

(56) References Cited

FOREIGN PATENT DOCUMENTS

| | | |
|---|---|---|
| EP | 0376936 A2 | 7/1990 |
| EP | 0424049 A2 | 4/1991 |
| EP | 0460594 A2 | 12/1991 |
| EP | 0479186 A2 | 4/1992 |
| EP | 0499759 A1 | 8/1992 |
| EP | 0560312 A1 | 3/1993 |
| EP | 0560035 A1 | 9/1993 |
| EP | 0579426 A1 | 1/1994 |
| EP | 0600414 A1 | 6/1994 |
| EP | 0614467 A1 | 9/1994 |
| EP | 0683176 A1 | 11/1995 |
| EP | 0684871 A1 | 12/1995 |
| EP | 0691367 A1 | 1/1996 |
| EP | 0696293 A1 | 2/1996 |
| EP | 0699213 A1 | 3/1996 |
| EP | 0707513 A1 | 4/1996 |
| EP | 0721798 A2 | 7/1996 |
| EP | 0655073 B1 | 12/1998 |
| EP | 0891990 A1 | 1/1999 |
| EP | 0942011 A1 | 9/1999 |
| EP | 1310295 A1 | 5/2003 |
| EP | 1415999 A1 | 5/2004 |
| EP | 1591460 A1 | 11/2005 |
| EP | 1600276 A1 | 11/2005 |
| EP | 2067799 A1 | 6/2009 |
| EP | 2246369 A1 | 11/2010 |
| EP | 2746300 A1 | 6/2014 |
| EP | 2746306 A1 | 6/2014 |
| EP | 2799456 A1 | 11/2014 |
| GB | 1272778 A | 5/1972 |
| WO | 9221705 A1 | 12/1992 |
| WO | 9311166 A1 | 6/1993 |
| WO | 9425495 A1 | 11/1994 |
| WO | 9425497 A1 | 11/1994 |
| WO | 9427134 A1 | 11/1994 |
| WO | 9428032 A1 | 12/1994 |
| WO | 9501831 A1 | 1/1995 |
| WO | 9517952 A1 | 7/1995 |
| WO | 9619503 A1 | 6/1996 |
| WO | 9632420 A1 | 10/1996 |
| WO | 9635936 A1 | 11/1996 |
| WO | 0026258 A1 | 5/2000 |
| WO | 0029452 A1 | 5/2000 |
| WO | 0105845 A1 | 1/2001 |
| WO | 02088194 A1 | 11/2002 |
| WO | 2005087361 A1 | 9/2005 |
| WO | 2007025640 A1 | 3/2007 |

OTHER PUBLICATIONS

Matthew Parkinson, et al.; Effect of Branch Length on 13C NMR Relaxation Properties in Molten Poly[ethylene-co-($\alpha$-olefin)] Model Systems; Macromolecular Chemistry and Physics; vol. 208; pp. 2128-2133; (2007).

M. Pollard, et al.; "Observation of Chain Branching in Polyethylene in the Solid State and Melt via 13C NMR Spectroscopy and Melt NMR Relaxation Time Measurements"; Macromolecules; vol. 37; No. 3; pp. 813-825; (2004).

Xenia Filip, et al.; "Heteronuclear decoupling under fast MAS by a rotor-synchronized Hahn-echo pulse train"; Journal of Magnetic Resonance; vol. 176; pp. 239-243; (2005).

John M. Griffin, et al.; "Low-load rotor-synchronised Hahn-echo pulse train (RS-HEPT) 1H decoupling in solid-state NMR: factors affecting MAS spin-echo dephasing times"; Magnetic Resonance in Chemistry; vol. 45; pp. S198-S208; (2007).

Patrice Castignolles, et al.; "Detection and quantification of branching in polyacrylates by size-exclusion chromatography (SEC) and melt-state 13C NMR spectroscopy"; Polymer; vol. 50; pp. 2373-2383; (2009).

Vincenzo Busico, et al.; "Microstructure of polypropylene"; Progress in Polymer Science; vol. 26; pp. 443-533; (2001).

Vincenzo Busico, et al.; "Full Assignment of the 13C NMR Spectra of Regioregular Polypropylenes: Methyl and Methylene Region"; Macromolecules; vol. 30; pp. 6251-6263; (1997).

Zhe Zhou, et al.; "A new decoupling method for accurate quantification of polyethylene copolymer composition and triad sequence distribution with 13C NMR"; Journal of Magnetic Resonance; vol. 187; pp. 225-233; (2007).

Vincenzo Busico, et al.; "Alk-1-ene Polymerization in the Presence of a Monocyclopentadienyl Zirconium(IV) Acetamidinate Catalyst: Microstructural and Mechanistic Insights"; Macromolecular Rapid Communications; vol. 28; pp. 1128-1134; (2007).

Luigi Resconi, et al.; "Selectivity in Propene Polymerization with Metallocene Catalysts", Chemical Reviews; vol. 100, No. 4; pp. 1253-1345; (2000).

* cited by examiner

PROCESS FOR PRODUCING LLDPE RESINS

FIELD OF THE INVENTION

The present invention is directed to a method of producing ethylene polymers. Especially, the present invention is directed to a method of making multimodal ethylene polymers where the method comprises polymerising ethylene in at least two polymerisation stages.

Problem to be Solved

It is known to produce ethylene copolymers suitable for producing films by copolymerising ethylene in two polymerisation stages, for instance from EP-A-691367 which discloses bimodal ethylene copolymers produced in two fluidised bed reactors. The document does not disclose a catalyst which is similar to that of the present invention.

EP-A-560312 discloses a process for polymerising ethylene in two gas phase reactors in the presence of a prepolymerised Ziegler-Natta catalyst which may comprise an internal donor. Suitable internal donors were reported to be ethers, esters, amines, ketones and diethers. The catalyst used in the examples did not contain an internal donor.

EP-A-2067799 discloses multimodal LLDPE resins which have been produced in two polymerisation stages in a loop and a gas phase reactor in the presence of a ligand-modified catalyst.

EP-A-2246369 discloses LLDPE produced in the presence of a Ziegler-Natta catalyst with DEAC as a cocatalyst. While the document briefly refers to two-stage polymerisation its examples are one-stage polymerisation runs.

EP-A-2799456 discloses a Ziegler-Natta procatalyst comprising chlorine, magnesium, titanium and an internal donor comprising two oxygen containing rings. The polymerisation examples did not contain any bimodal or multimodal polymerisations.

In view of the prior art there still remains a need for a process for producing multimodal LLDPE polymers where the melt flow rate of the multimodal polymer can be controlled in wide limits and where the process can be operated at a low content of condensable material.

SUMMARY OF THE INVENTION

The present invention provides a process for producing copolymers of ethylene and at least one alpha-olefin having from 4 to 10 carbon atoms in the presence of a solid Ziegler-Natta catalyst comprising of magnesium, titanium, halogen and an internal organic compound, the copolymer having a density of from 906 to 937 kg/m³ and a melt flow rate $MFR_{21}$ measured at 190° C. under 21.6 kg load of from 3 to 150 g/10 min comprising the steps of (A) homopolymerising ethylene or copolymerising ethylene and a first alpha-olefin having from 4 to 10 carbon atoms in a first polymerisation stage in the presence of the polymerisation catalyst, hydrogen and optionally the first alpha-olefin wherein the molar ratio of hydrogen to ethylene in the fluid reaction mixture of the first polymerisation stage is from 200 to 50000 mol/kmol and the molar ratio of the first alpha-olefin to ethylene in the fluid reaction mixture of the first polymerisation stage is from 0 to 1500 mol/kmol, to produce a first homo- or copolymer of ethylene; (B) copolymerising ethylene and a second alpha-olefin having from 4 to 10 carbon atoms in a second polymerisation stage in the presence of the first homo- or copolymer of ethylene and the solid Ziegler-Natta catalyst to produce a polymer mixture comprising the first homo- or copolymer of ethylene and a second copolymer of ethylene, the polymer mixture having a density of from 906 to 937 kg/m³ and a melt flow rate $MFR_{21}$ of from 3 to 150 g/10 min; (C) recovering the polymer mixture, characterised in that the polymerisation catalyst comprises an internal organic compound having the formula (I):

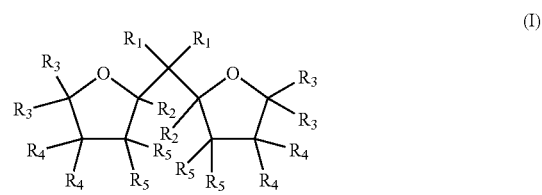

(I)

wherein in the formula (I) $R_1$ to $R_5$ are the same or different and can be hydrogen, a linear or branched C1 to C8-alkyl group, or a C3-C8-alkylene group, or two or more of $R_1$ to $R_5$ can form a ring, and the two oxygen-containing rings are individually saturated or partially unsaturated or unsaturated.

DETAILED DESCRIPTION

Definitions

By multimodal copolymer is meant a copolymer which contains distinct components having different average molecular weights or different contents of comonomer or both. The multimodal copolymer is produced by copolymerising ethylene and a comonomer in two or more polymerisation stages where the polymerisation conditions are sufficiently different to allow production of different polymers in different stages.

By continuously operating process is meant a process or a process stage into which the feedstock materials are continuously or intermittently introduced and from which the product is continuously or intermittently withdrawn. By continuous addition or withdrawal is meant that an uninterrupted stream goes in or flows out of the process or process stage. By intermittent addition or withdrawal is meant that during the operation of the process small batches of raw material are constantly added into or product is constantly withdrawn from the process or process stage. The cycle time between such batches is small compared to the overall average residence time of the process or process stage, such as not more than 10% of the overall average residence time.

By fluid reaction mixture it is meant the fluid phase (liquid, gas or supercritical) in which the reactants (ethylene, comonomer and hydrogen) are dissolved. The particles comprising the catalyst and polymer are then suspended in the fluid reaction mixture.

In the present text the expressions "internal organic compound" and "internal donor" are used synonymously.

Catalyst

The solid catalyst component used in copolymerisation of ethylene is a solid Ziegler-Natta catalyst component for ethylene polymerisation, which solid Ziegler-Natta catalyst component comprises magnesium, titanium, halogen and an internal organic compound. The internal donor is selected from bi-(oxygen containing ring) compounds of formula (I)

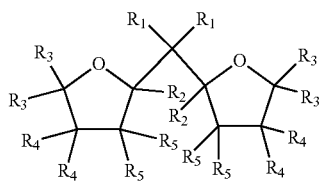

where $R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated.

Accordingly, the catalyst used in the present invention comprises a solid $MgCl_2$ supported component which is prepared by a method comprising the steps:
a) providing solid carrier particles of $MgCl_2$*mROH adduct
b) pre-treating the solid carrier particles of step a) with a compound of Group 13 metal
c) treating the pre-treated solid carried particles of step b) with a transition metal compound of Group 4 to 6
d) recovering the solid catalyst component
wherein the solid carrier particles are contacted with an internal organic compound of formula (I) before treating the solid carrier particles in step c)

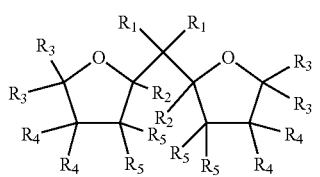

and
wherein in the formula (I)
$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring,
the two oxygen-containing rings are individually saturated or partially unsaturated or unsaturated, and
R in the adduct $MgCl_2$*mROH is a linear or branched alkyl group with 1 to 12 C atoms, and m is 0 to 6.

Accordingly, the internal organic compound of formula (I) is contacted with the solid carrier particles before treatment of solid carrier particles with the transition metal compound of Group 4 to 6. Thus, said internal organic compound can be contacted with the solid carrier particles before step b), i.e. before pre-treating the solid carrier particles with Group 13 metal compound, or simultaneously with said pre-treatment step, or after step b), but before treating the solid carrier particles with the transition metal compound of Group 4 to 6.

Further, one object of the invention is to use the catalyst in accordance to what was disclosed above in the process for producing linear low density polyethylene in a multistage process.

The catalyst will be described in the following in greater detail, referring to the particular preferred embodiments.

As used herein, the term Ziegler Natta (ZN) catalyst component is intended to cover a catalyst component comprising a transition metal compound of Group 4 to 6, a compound of a metal of Group 13 of the Periodic Table (IUPAC, Nomenclature of Inorganic Chemistry, 1989) and an internal organic compound supported on $MgCl_2$ based carrier.

Magnesium dihalide is used as a starting material for producing a carrier. The solid carrier is a carrier where alcohol is coordinated with Mg dihalide, preferably $MgCl_2$. The $MgCl_2$ is mixed with one or more alcohols having the formula ROH and the solid carrier $MgCl_2$*mROH is formed according to the well-known methods. As examples, spray drying or spray crystallisation methods can be used to prepare the magnesium halide. Spherical and granular $MgCl_2$*mROH carrier materials of different sizes (5-100 µm) are suitable to be used in the present invention. The alcohol in producing $MgCl_2$*mROH carrier material is an alcohol ROH, where R is a linear or branched alkyl group containing 1 to 12 carbon atoms, preferably 1 to 8 carbon atoms, like 1 to 4 carbon atoms. Ethanol is typically used. In $MgCl_2$*mROH, m is from 0 to 6, more preferably from 1 to 4, especially from 2.7 to 3.3.

$MgCl_2$*mROH is available from commercial sources or can be prepared by methods described in prior art. Preparation methods of $MgCl_2$*mROH carrier is described in several patents e.g. in EP-A-376936, EP-A-424049, EP-A-655073 and EP-A-614467.

Group 13 metal compound, used in step b) is preferably an aluminium compound. Particularly preferably the aluminium compound is an aluminium compound of the formula $Al(alkyl)_xX_{3-x}$ (II), wherein each alkyl is independently an alkyl group of 1 to 12 carbon atoms, preferably 1 to 8 carbon atoms, more preferably 1 to 6 carbon atoms, X is halogen, preferably chlorine and $1<x\leq3$. The alkyl group can be linear, branched or cyclic, or a mixture of such groups.

Preferred aluminium compounds are dialkyl aluminium chlorides or trialkyl aluminium compounds, for example dimethyl aluminium chloride, diethyl aluminium chloride, di-isobutyl aluminium chloride, and triethylaluminium or mixtures therefrom. Most preferably the aluminium compound is a trialkyl aluminium compound, especially triethylaluminium compound.

The transition metal compound of Group 4 to 6 is preferably a Group 4 transition metal compound or a vanadium compound and is more preferably a titanium compound. Particularly preferably the titanium compound is a halogen-containing titanium compound of the formula $X_yTi(OR^8)_{4-y}$, wherein $R^8$ is a $C_{1-20}$ alkyl, preferably a $C_{2-10}$ and more preferably a $C_{2-8}$ alkyl group, X is halogen, preferably chlorine and y is 1, 2, 3 or 4, preferably 3 or 4 and more preferably 4.

Suitable titanium compounds include trialkoxy titanium monochlorides, dialkoxy titanium dichloride, alkoxy titanium trichloride and titanium tetrachloride. Preferably titanium tetrachloride is used.

The internal organic compound is selected from bi-cyclic ether compounds of formula (I):

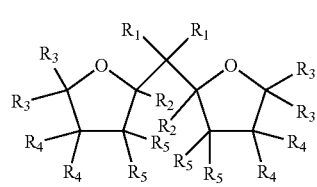

wherein in the formula (I)

$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, and whereby the two oxygen-containing rings are individually saturated or partially unsaturated or unsaturated.

Examples of preferred linear or branched $C_1$ to $C_8$-alkyl groups are methyl, ethyl, n-propyl, i-propyl, n-butyl, sec-butyl, tert-butyl, pentyl and hexyl groups.

Examples for preferred $C_3$-$C_8$-alkylene groups are pentylene and butylene groups.

The two $R_1$ are preferably the same and are a linear $C_1$ to $C_4$-alkyl groups, more preferably methyl or ethyl; or the two $R_1$ form a ring with the carbon atom they are attached to a ring with 3 to 7 carbon atoms, preferably cyclopentyl or cyclohexyl ring.

Most preferably both $R_1$ are methyl.

$R_2$ to $R_5$ are the same or different and are preferably H or a $C_1$ to $C_2$-alkyl groups, or two or more of $R_2$ to $R_5$ residues can form a ring. If one or more rings are formed by the residues $R_2$ to $R_5$, these are more preferably formed by $R_3$ and $R_4$ and/or $R_4$ and $R_5$.

Preferably the residues $R_2$ to $R_5$ do not form rings and more preferably at most two of the residues $R_2$ to $R_5$ are a methyl, the others are H. Most preferably $R_2$ to $R_5$ are all hydrogens.

Furthermore both oxygen-containing rings are preferably saturated or partially unsaturated or unsaturated. Each partially unsaturated or unsaturated oxygen-containing ring can have one or two double bonds.

More preferably both oxygen-containing rings are saturated.

In the most preferred embodiment, 2,2-di(2-tetrahydrofuryl)propane (DTHFP) is used with the isomers thereof. DTHFP is typically a 1:1 mol/mol diastereomeric mixture of D,L-(rac)-DTHFP and meso-DTHFP.

It has been found that using an internal organic compound that is enriched in isomers of DTHFP, that the catalyst morphological properties are not influenced. It was found that by using enriched rac-DTHFP, where the ratio of D,L-(rac)-DTHFP/meso-DTHFP is at least 2/1 mol/mol, it was possible to produce the catalyst morphology as good as with the equimolar (rac) and (meso) mixture.

Enrichment was surprisingly successful via complexation with $MgCl_2$.

When producing the supported catalyst component used in the present invention it is especially preferred that the internal organic compound, as defined above, is added to the catalyst mixture before, during or after the pre-treating of the $MgCl_2$-mROH with the Group 13 metal compound, but before treating it with the compound of a transition metal of Group 4 to 6.

Thus, according to one suitable method the solid catalyst component is prepared by a process comprising the steps of:
i) providing solid $MgCl_2$*mROH carrier, wherein m is 1 to 4 and R is a linear or branched alkyl group containing 1 to 8 C atoms
ii) pre-treating the solid carrier particles of step i) with an Al compound
iii) adding the internal organic compound of formula (I) into the pre-treated solid carrier of step ii) or
iii') simultaneously with step ii) adding the internal organic compound of formula (I) into the solid carrier
iv) treating the pre-treated solid carried particles of step iii) or iii') with $TiCl_4$ and
v) recovering the solid catalyst component Thus, according to another suitable method the solid catalyst component is prepared by a process comprising the steps of:
i) providing solid $MgCl_2$*mROH carrier, wherein m is 1 to 4 and R is a linear or branched alkyl group containing 1 to 8 C atoms
ii-1) adding the internal organic compound of formula (I) into the solid carrier of step i)
iii-1) pre-treating the solid carrier particles of step ii-1) with an Al compound
iv-1) treating the pre-treated solid carried particles of step iii-1) with $TiCl_4$ and
v-1) recovering the solid catalyst component.

According to either one of the methods above the Al compound can be added to the solid carrier before or after adding the internal organic compound or simultaneously with the internal organic compound to the carrier.

Most preferably in the above-mentioned embodiments, m=2.7 to 3.3, ROH is ethanol, aluminum compound is an aluminium trialkyl compound, such as triethyl aluminium, and as internal organic compound is 2,2-di(2-tetrahydrofuryl)propane, or 2,2-di-(2-furan)-propane, especially 2,2-di(2-tetrahydrofuryl)propane.

According to the catalyst preparation method of the present invention the pre-treatment with the Group 13 metal compound, preferably an aluminum compound, can be done by adding a solution of said aluminum compound in inert organic solvent, preferably in inert aliphatic hydrocarbon solvent, for example in heptane. The method of the invention allows use of a concentrated aluminum compound solution. In the case where triethylaluminiun (TEA) is used, a 15 to 100 wt-% solution of TEA in an inert hydrocarbon, preferably a 25 to 100 wt-% solution of TEA in inert aliphatic hydrocarbon solvent, like in heptane can be used, or neat TEA. It was found that by using these more concentrated solutions, the morphology remains advantageous and a reduced amount of waste is produced.

The final solid catalyst component typically has Mg/Ti mol/mol ratio of from 1 to 10, preferably from 2 to 8, especially from 3 to 7, Al/Ti mol/mol ratio of from 0.01 to 1, preferably from 0.1 to 0.5 and Cl/Ti mol/mol ratio of from 5 to 20, preferably from 10 to 17.

Particles of the solid catalyst component of the invention are uniform in particle size without fines or agglomerates.

The supported catalyst component as described above allows the production of polymers with increased molecular weight. The increase in molecular weight is not made at the expense of the productivity of the catalyst. The productivity remains at an acceptably high level or is even increased compared to use of a catalyst component of similar type but using a different internal organic compound and/or prepared by adding the internal organic compound during or after the treatment step with $TiCl_4$, or using said organic compound as external additive. Thus, the performance of the catalyst prepared by the method of the present invention makes it possible to broaden the preparation window of the polyethylene such that polymerisation with both higher and lower amounts of hydrogen is possible while retaining good productivity.

The catalyst used in the process of the invention comprises, in addition to the solid catalyst component as defined above, a cocatalyst, which is also known as an activator. Cocatalysts are organometallic compounds of Group 13 metal, typically aluminum compounds. These compounds include alkyl aluminium halides, preferably alkyl aluminium chlorides, such as ethylaluminium dichloride, diethylaluminium chloride, ethylaluminium sesquichloride, dimethyl-aluminium chloride and the like. They also include trialkylaluminium compounds, such as trimethylaluminium, triethylaluminium, tri-isobutylaluminium, trihexylaluminium and tri-n-octylaluminium. Also other aluminium alkyl compounds, such as isoprenylaluminium, may be used. Especially preferred cocatalysts are trialkylaluminiums, of which triethylaluminium, trimethylaluminium and tri-isobutylaluminium are particularly used.

The catalyst of the invention may also comprise an external additive, like external donor. External additives that can be used include ether compounds, typically tetrahydrofuran, siloxane or silane type of external donors and/or alkyl halides as is known from prior art. The final solid catalyst component, i.e. the ZN solid catalyst component, obtained according to any one of the above described methods, is combined with an activator.

Suitable activators are optionally halogenated aluminium alkyl cocatalysts of formula (V) $(C_1-C_4\text{-alkyl})_p-Al-X_{3-p}$, wherein X is chlorine, bromine, iodine or fluorine and p is 1, 2 or 3.

The $C_1-C_4$-alkyl groups can be linear or branched or cyclic, or a mixture of such groups.

X is preferably chlorine or bromine, most preferably X is chlorine.

Suitable activators are for example trimethyl aluminium (TMA), triethyl aluminium (TEA) dimethyl aluminium chloride (DMAC), diethyl aluminium chloride (DEAC), diisobutyl aluminium chloride (DIBAC), ethyl aluminium dichloride (EADC), methyl aluminium dichloride (MADC). A preferred activator used in the process of the invention is triethylaluminium.

The amount in which the activator is used depends on the specific catalyst and the activator. Typically triethylaluminium is used in such amount that the molar ratio of aluminium to the transition metal, like Al/Ti, is from 1 to 1000, preferably from 3 to 100 and in particular from about 5 to about 30 mol/mol.

Polymerisation Process

The polymerisation process comprises the first polymerisation stage and the second polymerisation stage. In addition the process may comprise further polymerisation stages, for instance, for producing one or more additional polymer components or for prepolymerising the catalyst. The additional polymerisation stages may precede or succeed either one of the first and the second polymerisation stage. Furthermore, either one of the first and second polymerisation stages may be divided into two or more steps wherein either the first homo- or copolymer of ethylene or the second copolymer of ethylene is produced in two or more steps where each such step operates in conditions producing the respective first homo- or copolymer or second copolymer.

Prepolymerisation

The polymerisation steps may be preceded by a prepolymerisation step. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation step is conducted in slurry.

Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 50 to 70° C.

The pressure is not critical and is typically from 1 to 150 bar, preferably from 40 to 80 bar.

The amount of monomer is typically such that from about 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all (separately or together) introduced to the prepolymerisation step when a prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

Typically, the amounts of hydrogen and comonomer are adjusted so that the presence of the prepolymer has no effect on the properties of the final multimodal polymer. Especially, it is preferred that melt flow rate of the prepolymer is greater than the melt flow rate of the final polymer but smaller than the melt flow rate of the polymer produced in the first polymerisation stage. It is further preferred that the density of the prepolymer is greater than the density of the final polymer. Suitably the density is approximately the same as or greater than the density of the polymer produced in the first polymerisation stage. Further, typically the amount of the prepolymer is not more than about 5% by weight of the multimodal polymer comprising the prepolymer.

First Polymerisation Stage

In the first polymerisation stage a first homo- or copolymer of ethylene is produced. This is done by introducing a polymerisation catalyst, optionally through the prepolymerisation stage or a prior polymerisation stage as described above, into the first polymerisation stage together with ethylene, hydrogen and optionally an alpha-olefin comonomer.

Hydrogen is introduced into the first polymerisation stage for controlling the $MFR_2$ of the first homo- or copolymer of ethylene. The amount of hydrogen is such that the molar ratio of hydrogen to ethylene in the fluid reaction mixture is within the range of from 200 to 50000 mol/kmol (or mol/1000 mol), preferably of from 200 to 1000 mol/kmol. If the first polymerisation stage is conducted as a slurry polymerisation stage, preferably in a loop reactor, the molar ratio of hydrogen to ethylene in the fluid reaction mixture is suitably from 200 to 1000 mol/kmol, preferably from 300 to 800 mol/kmol.

According to one embodiment the first homo- or copolymer of ethylene is a homopolymer. Thus, the first alpha-olefin is not present in the first polymerisation stage. Hydrogen is present in an amount described above.

According to another embodiment the first homo- or copolymer of ethylene is a copolymer of ethylene and the first alpha-olefin. In such case the molar ratio of the first alpha-olefin to ethylene in the fluid reaction mixture is from 100 to 1000 mol/kmol, preferably from 200 to 800 mol/kmol. The first alpha-olefin is preferably selected from the group consisting of 1-butene, 1-hexene and 4-methyl-1-pentene, more preferably consisting of 1-butene and 1-hexene. Also in this embodiment hydrogen is present in an amount as was described above.

When produced in the conditions as defined above the first homo- or copolymer of ethylene typically has a melt flow rate $MFR_2$ of from 100 to 1000 g/10 min, preferably from 150 to 750 g/10 min and more preferably from 200 to 600 g/10 min. Furthermore, the first copolymer typically has a density of from 930 to 980 $kg/m^3$, preferably from 940 to 978 $kg/m^3$ and most preferably from 945 to 976 $kg/m^3$.

When the first homo- or copolymer of ethylene is a copolymer of ethylene, it then preferably has a density of from 930 to 955 $kg/m^3$, more preferably from 940 to 953 $kg/m^3$ and most preferably from 945 to 953 $kg/m^3$.

As the person skilled in the art is aware of, the $MFR_2$ and density ranges apply for the first homo- or copolymer of ethylene. If the first polymerisation stage is preceded by another polymerisation stage where a substantial amount of polymer is produced then the above-mentioned $MFR_2$ and density ranges given for the first homo- or copolymer do not necessarily apply for the polymer mixture comprising the polymers produced in the prior polymerisation stage and the first polymerisation stage.

The first polymerisation stage is preferably conducted as a slurry polymerisation. The slurry polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid reaction mixture may be from 1 to about 50% by mole, preferably from about 2 to about 20% by mole and in particular from about 2 to about 10% by mole. The benefit of having a high ethylene concentration is that the productivity of the catalyst is increased but the drawback is that more ethylene then needs to be recycled than if the concentration was lower.

The temperature in the first polymerisation stage is typically from 60 to 100° C., preferably from 70 to 95° C. An excessively high temperature should be avoided to prevent partial dissolution of the polymer into the diluent and the fouling of the reactor. The pressure is from 1 to 150 bar, preferably from 40 to 80 bar.

The slurry polymerisation may be conducted in any known reactor used for slurry polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the first polymerisation stage as a slurry polymerisation in one or more loop reactors, more preferably in one loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerisation stage continuously.

If the first homo- or copolymer of ethylene is the first copolymer of ethylene then the first alpha-olefin comonomer is introduced into the first polymerisation stage for controlling the density of the first copolymer of ethylene. The amount of comonomer needed to reach the desired density depends on the comonomer type, the catalyst used and the polymerisation conditions, especially on $H_2/C_2$ ratio.

The contents of hydrogen, ethylene and the first alpha-olefin comonomer may be measured, as it is known in the art, by withdrawing a sample stream from the reactor or from the stream withdrawn from the reactor, as disclosed in WO-A-1996035936, WO-A-1994027134 and EP-A-460594. Suitably, such a sample stream is withdrawn from a pressure reduction stage, or flash, between the first and second polymerisation stages.

The average residence time in the first polymerisation stage is typically from 20 to 120 minutes, preferably from 20 to 70 minutes. As it is well known in the art the average residence time T can be calculated from:

$$\tau = \frac{V_R}{Q_o} \quad (\text{eq. 1})$$

Where $V_R$ is the volume of the reaction space (in case of a loop reactor, the volume of the reactor, in case of the fluidised bed reactor, the volume of the fluidised bed) and $Q_o$ is the volumetric flow rate of the product stream (including the polymer product and the fluid reaction mixture).

It is possible, and occasionally preferred, to conduct the first polymerisation stage in more than one step, for instance in two steps. When the first polymerisation stage is conducted in more than one step the first homo- or copolymer of ethylene is a mixture of two or more homo- or copolymers of ethylene. In such a case all such steps should be conducted in conditions as described above. Further, the amount of the first homo- or copolymer of ethylene is then the sum of the amounts of polymers produced in all such steps.

Furthermore, as described above, it is possible that one or more additional polymerisation stages, where a polymer which is different from the first homo- or copolymer of ethylene is produced, precede the first polymerisation stage.

Second Polymerisation Stage

In the second polymerisation stage a polymer mixture comprising the first homo- or copolymer of ethylene and a second copolymer of ethylene is formed. This is done by introducing the particles of the first homo- or copolymer of ethylene, containing active catalyst dispersed therein, together with additional ethylene and a second alpha-olefin comonomer into the second polymerisation stage. Hydrogen may be introduced for controlling the molecular weight. This causes the second copolymer of ethylene to form on the particles comprising the first homo- or copolymer of ethylene.

The melt flow rate $MFR_5$ of the polymer mixture preferably is from 0.5 to 5.0 g/10 min, more preferably from 0.8 to 4.0 g/10 min. The polymer mixture preferably has $MFR_{21}$ of from 20 to 150 g/10 min, more preferably 25 to 100 g/10 min. Furthermore, it preferably has the flow rate ratio $FRR_{21/5}$ of from 10 to 50, more preferably from 15 to 40.

The second alpha-olefin comonomer is selected from alpha-olefins containing from 4 to 10 carbon atoms. The second alpha-olefin comonomer may be the same as or different from the first alpha-olefin comonomer, if the first alpha-olefin comonomer was present. In one preferred embodiment of the invention the first alpha-olefin comonomer and the second alpha-olefin comonomer are the same, such as 1-butene or 1-hexene, especially preferably 1-butene. In another preferred embodiment of the invention the first alpha-olefin comonomer is different from the second alpha-olefin comonomer. Then the first alpha-olefin comonomer can be 1-butene and the second alpha-olefin comonomer 1-hexene or 1-octene, more preferably 1-hexene. According to a further embodiment the first alpha-olefin comonomer is absent and the second alpha-olefin comonomer is 1-butene, 1-hexene or 1-octene, or their mixture, preferably 1-hexene. The content of the second alpha-olefin comonomer is controlled to obtain the desired density of the polymer mixture. Typically the polymer mixture has a density of from 906 to 935 kg/m$^3$, preferably from 910 to 932 kg/m$^3$ and more preferably from 913 to 930 kg/m$^3$.

When the polymer mixture has a density within the lower end of the range, i.e., from 906 to 925 kg/m$^3$, then it is preferred that the first homo- or copolymer of ethylene is a copolymer of ethylene and preferably has a density of from 930 to 955 kg/m$^3$, more preferably from 940 to 953 kg/m$^3$ and most preferably from 945 to 953 kg/m$^3$. When the polymer mixture has a density within the upper end of the range, i.e., from 925 to 935 kg/m$^3$, then the first homo- or copolymer of ethylene may be a homopolymer of ethylene or a copolymer of ethylene and the second alpha olefin and it typically has a density of from 945 to 980 kg/m$^3$, preferably from 945 to 978 kg/m$^3$ and most preferably from 948 to 975 kg/m$^3$.

The $MFR_{21}$ of the second copolymer of ethylene cannot be measured because the second copolymer cannot be isolated from the polymer mixture.

Hydrogen feed is adjusted to achieve a desired melt flow rate (or molecular weight) of the polymer mixture. Suitably the hydrogen feed is controlled to maintain constant hydrogen to ethylene ratio in the fluid reaction mixture. The actual ratio depends on the catalyst as well as the type of the polymerisation. The desired polymer properties have been obtained in gas phase polymerisation in a fluidised bed reactor by maintaining the ratio in the gas phase within the range of from 10 to 150 mol/kmol, preferably from 20 to 100 mol/kmol, such as from 30 to 90 mol/kmol.

The second alpha-olefin comonomer is typically introduced to maintain a constant comonomer to ethylene ratio in the fluid reaction mixture. The comonomer to ethylene ratio that is needed to produce a polymer with the desired density depends, among others, on the type of comonomer and the type of catalyst. With 1-hexene as a comonomer the desired polymer properties have been obtained in gas phase polymerisation in a fluidised bed reactor with a molar ratio of 1-hexene to ethylene in the gas phase of from 50 to 400 mol/kmol, preferably from 100 to 250 mol/kmol and in particular from 120 to 220 mol/kmol.

Preferably the second polymerisation stage is conducted as a fluidised bed gas phase polymerisation. In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising the olefin monomer, eventual comonomer(s), eventual chain growth controllers or chain transfer agents, such as hydrogen, and eventual inert gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidisation gas to compensate for losses caused, among other, by reaction or product withdrawal.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP 600414 and EP-A-721798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be greater that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practise. An overview is given, among others in Geldart: Gas Fluidisation Technology, J. Wiley & Sons, 1986.

When the fluidisation gas is contacted with the bed containing the active catalyst the reactive components of the gas, such as monomers, comonomers and chain transfer agents, react in the presence of the catalyst to produce the polymer product. At the same time the gas is heated by the reaction heat.

The unreacted fluidisation gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

Typically the fluidised bed polymerisation reactor is operated at a temperature within the range of from 50 to 100° C., preferably from 65 to 90° C. The pressure is suitably from 10 to 40 bar, preferably from 15 to 30 bar.

The average residence time in the second polymerisation stage is typically from 40 to 240 minutes, preferably from 60 to 180 minutes.

As discussed above, it is preferred to conduct the second polymerisation stage in gas phase in one or more gas phase reactors, more preferably in one fluidised bed reactor.

The polymer mixture typically comprises from 25 to 57% by weight of the first homo- or copolymer and from 43 to 75% by weight of the second copolymer. Preferably the polymer mixture comprises from 35 to 57% by weight of the first homo- or copolymer of ethylene and from 43 to 65% by weight of the second copolymer of ethylene. The polymer mixture may contain other polymers in addition to the first homo- or copolymer of ethylene and the second copolymer of ethylene but the contents of the first homo- or copolymer of ethylene and the second copolymer of ethylene must be within the above-mentioned limits.

According to the most preferred embodiment the polymerisation process of the present invention is conducted in a cascaded sequence comprising at least one loop reactor followed by at least one gas phase reactor.

Extrusion

When the polymer mixture has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilisers, neutralisers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 180 to 230 kWh/ton. The melt temperature is typically from 220 to 290° C.

Benefits of the Invention

The process according to the present invention operates smoothly and without difficulty. Especially, the catalysts have good productivity in the later stages of the process. Further, the catalysts have a good reactivity towards the comonomer. The dew point temperature in the gas phase reactor is low with the catalysts of the invention. When operating gas phase at 85° C., the dew point temperature is preferred to be not more than 70° C., more preferably not more than 65° C. With the catalysts of the invention the dew point temperature is substantially lower than 65° C. (48.9-

57.0° C.), thus there are no operational problems. If the dew point temperature is above 70° C. operability will be worse, there is a risk of sheeting and chunking in the reactor.

The gas phase reactor can be operated with a low level of condensable material. Therefore, the amount of residual hydrocarbon in the polymer withdrawn from the process is small. This simplifies the post-reactor treatment of the resulting polymer. Especially, the purging step to remove residual hydrocarbons from the polymer can be conducted economically.

The catalysts used in the process of the invention are less sensitive to hydrogen than some prior art catalysts. This allows controlling the MFR of the resulting bimodal polymer in the step where the high molecular weight copolymer of ethylene is produced. It is possible to produce these bimodal copolymers of ethylene with high molecular weight in a plant scale. Because of the higher $H_2$ sensitivity of the prior art catalyst it is not possible to obtain similar molecular weights in plant scale where at least some amount of hydrogen is always fed to the gas phase reactor.

The copolymers of ethylene produced by the process according to the present invention have better or similar dart drop values compared to prior art.

Description of Methods

Melt Flow Rate

Melt flow rate (MFR) was determined according to ISO 1133 at 190° C. The load under which the measurement is conducted is given as a subscript. Thus, the MFR under the load of 2.16 kg is denoted as $MFR_2$. The melt flow rate $MFR_{21}$ is correspondingly determined at 190° C. under a load of 21.6 kg and $MFR_5$ under a load of 5 kg.

Density

Density of the polymer was measured according to ISO 1183-1:2004 Method A on compression moulded specimen prepared according to EN ISO 1872-2 (February 2007) and is given in kg/m$^3$.

Reactor Gas Composition

Reactor gas composition in a slurry reactor can be measured, as is well known in the art, from the flash gas after the reactor by using on-line gas chromatography, as disclosed, for instance, in WO-A-1996035936.

Reactor gas composition in a gas phase reactor can be analysed from the circulation gas by using on-line chromatography, as it is well known in the art.

The instruments are calibrated, as it is known in the art, with calibration gas mixtures having a known composition which is close to that of the gas mixture present in the polymerisation process.

Dart Drop Strength (DDI)

Dart-drop is measured using ASTM D1709, method A (Alternative Testing Technique) from the film samples. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

Quantification of Microstructure by NMR Spectroscopy

Quantitative nuclear-magnetic resonance (NMR) spectroscopy was used to quantify the comonomer content of the polymers.

Quantitative $_{13}C\{_1H\}$ NMR spectra recorded in the molten-state using a Bruker Advance III 500 NMR spectrometer operating at 500.13 and 125.76 MHz for $_1H$ and $_{13}C$ respectively. All spectra were recorded using a $_{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {klimke06, parkinson07, castignolles09} Standard single-pulse excitation was employed utilising the NOE at short recycle delays{pollard04, klimke06} and the RS-HEPT decoupling scheme {fillip05,griffin07}. A total of 1024 (1 k) transients were acquired per spectra.

Quantitative $_{13}C\{_1H\}$ NMR spectra were processed, integrated and relevant quantitative properties determined from the integrals. All chemical shifts are internally referenced to the bulk methylene signal (6+) at 30.00 ppm {randall89}.

The amount of ethylene was quantified using the integral of the methylene (6+) sites at 30.00 ppm accounting for the number of reporting sites per monomer:

$$E=I_{\delta+}/2$$

The presence of isolated comonomer units is corrected for based on the number of isolated comonomer units present:

$$E\text{total}=E+(3*B+2*H)/2$$

where B and H are defined for their respective comonomers. Correction for consecutive and non-consecutive commoner incorporation, when present, is undertaken in a similar way.

Characteristic signals corresponding to the incorporation of 1-butene were observed and the comonomer fraction calculated as the fraction of 1-butene in the polymer with respect to all monomer in the polymer:

$$fB\text{total}=(B\text{total}/(E\text{total}+B\text{total}+H\text{total})$$

The amount isolated 1-butene incorporated in EEBEE sequences was quantified using the integral of the *B2 sites at 38.3 ppm accounting for the number of reporting sites per comonomer:

$$B=I^*_{B2}$$

The amount consecutively incorporated 1-butene in EEBBEE sequences was quantified using the integral of the $\alpha\alpha B2B2$ site at 39.4 ppm accounting for the number of reporting sites per comonomer:

$$BB=2*I_{\alpha\alpha B2B2}$$

The amount non-consecutively incorporated 1-butene in EEBEBEE sequences was quantified using the integral of the $\beta\beta B2B2$ site at 24.7 ppm accounting for the number of reporting sites per comonomer:

$$BEB=2*I_{\beta\beta B2B2}$$

Due to the overlap of the *B2 and *$\beta$B2B2 sites of isolated (EEBEE) and non-consecutively incorporated (EEBEBEE) 1-butene respectively the total amount of isolated 1-butene incorporation is corrected based on the amount of non-consecutive 1-butene present:

$$B=I^*{B2}-2*I_{\beta\beta B2B2}$$

The total 1-butene content was calculated based on the sum of isolated, consecutive and non-consecutively incorporated 1-butene:

$$B\text{total}=B+BB+BEB$$

The total mole fraction of 1-butene in the polymer was then calculated as:

$$fB=(B\text{total}/(E\text{total}+B\text{total}+H\text{total})$$

Characteristic signals corresponding to the incorporation of 1-hexene were observed and the comonomer fraction calculated as the fraction of 1-hexene in the polymer with respect to all monomer in the polymer:

$$fHtotal=(Htotal/(Etotal+Btotal+Htotal)$$

The amount isolated 1-hexene incorporated in EEHEE sequences was quantified using the integral of the *B4 sites at 39.9 ppm accounting for the number of reporting sites per comonomer:

$$H=I*_{B4}$$

The amount consecutively incorporated 1-hexene in EEHHEE sequences was quantified using the integral of the ααB4B4 site at 40.5 ppm accounting for the number of reporting sites per comonomer:

$$HH=2*I\alpha\alpha B4B4$$

The amount non-consecutively incorporated 1-hexene in EEHEHEE sequences was quantified using the integral of the ββB4B4 site at 24.7 ppm accounting for the number of reporting sites per comonomer:

$$HEH=2*I\beta\beta B4B4$$

The total mole fraction of 1-hexene in the polymer was then calculated as:

$$fH=(Htotal/(Etotal+Btotal+Htotal)$$

The mole percent comonomer incorporation is calculated from the mole fraction:

$$B[mol\%]=100*fB$$

$$H[mol\%]=100*fH$$

The weight percent comonomer incorporation is calculated from the mole fraction:

$$B[wt\%]=100*(fB*56.11)/((fB*56.11)+(fH*84.16)+((1-(fB+fH))*28.05))$$

$$H[wt\%]=100*(fH*84.16)/((fB*56.11)+(fH*84.16)+((1-(fB+fH))*28.05))$$

klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
busico01
Busico, V., Cipullo, R., Prog. Polym. Sci. 26 (2001) 443
busico97
Busico, V., Cipullo, R., Monaco, G., Vacatello, M., Segre, A. L., Macromoleucles 30 (1997) 6251
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
resconi00
Resconi, L., Cavallo, L., Fait, A., Piemontesi, F., Chem. Rev. 2000, 100, 1253

EXAMPLES

Catalyst Preparation for Catalysts 1 and 2
Preparation of Pre-Treated Support Material for Catalyst 1:
A jacketed 160 dm$^3$ stainless steel reactor equipped with a helical mixing element was pressurized with N$_2$ to 2.0 barg and depressurized down to 0.2 barg until the O$_2$ level was less than 3 ppm. The vessel was then charged with heptane (20.5 kg) and 2,2-di(tetrahydrofuryl)propane (0.38 kg; 2.06 mol; DTHFP). The obtained mixture was stirred for 20 min at 40 rpm. The 45 µm MgCl$_2$*3EtOH carrier (5.0 kg; DTHFP/Mg=0.1 mol/mol; 20.3 mol of Mg; 9.86 wt-% of Mg) was added to the reactor with stirring. This suspension was cooled to approximately –20° C. and the 25 wt % solution of triethylaluminum (30.4 kg, 66.6 mol of Al; Al/EtOH=1.0 mol/mol) in heptane was added in aliquots during 2.5 h time while keeping the temperature below 0° C. After the TEA addition, the reaction mixture was gradually heated to 80° C. over a period of 2.5 h and kept at this temperature for additional 20 min at 40 rpm. The suspension was allowed to settle for 10 min, and the mother liquor was removed through a 20 µm filter net in the bottom of the reactor during 10 min. The vessel was charged with warm toluene (43 kg) and then stirred at 40 rpm for 20 min at 40-60° C. The suspension was allowed to settle for 10 min at 40° C. and the liquid removed through a 20 µm filter net in the bottom of the reactor during 10 min.
Catalyst Preparation for Catalyst 1:
The vessel containing the pre-treated support material was charged with toluene (43 kg) and then cooled to approximately 30° C. Neat TiCl$_4$ (3.85 kg, 20.3 mol; Ti/Mg=1.0 mol/mol) was added. The obtained suspension was heated to approximately 90° C. over a period of 2 h and kept at this temperature for additional 1 h with stirring at 40 rpm. The suspension was allowed to settle for 10 min at approximately 90° C. and the mother liquor was removed through a 20 µm filter net in the bottom of the reactor during 10 min. The obtained solid material was washed twice with toluene (43 kg each) at =90° C. and once with heptane (34 kg) at 40° C. All three of these washing steps used the same sequence of events: addition of preheated (90 or 40° C.) solvent, then stirring at 40 rpm for 30 min, allowing the solid to settle for 10 min, and then removal of liquid through a 20 µm filter net in the bottom of the reactor during 10 min.

The obtained catalyst was mixed with 15 kg of white oil and dried 4 h at 40-50° C. with nitrogen flow (2 kg/h) and vacuum (–1 barg). The dry catalyst yield was 2.62 kg (83.5% based on Mg).
Preparation of Pre-Treated Support Material for Catalyst 2:
A jacketed 160 dm$^3$ stainless steel reactor equipped with a helical mixing element was pressurized with N$_2$ to 2.0 barg and depressurized down to 0.2 barg until the O$_2$ level was less than 3 ppm. The vessel was then charged with heptane (20.5 kg) and 2,2-di(tetrahydrofuryl)propane (0.518 kg; 2.81 mol; DTHFP). The obtained mixture was stirred for 20 min at 40 rpm. The MgCl$_2$*3EtOH carrier (6.5 kg; DTHFP/Mg=0.1 mol/mol; 27.5 mol of Mg; 10.29 wt-% of Mg; d$_{10}$=13.5 µm, d$_{50}$=21.5 µm and d$_{90}$=34.2 µm, granular shaped, Span=0.96) was added to the reactor with stirring.

This suspension was cooled to approximately −20° C. and the 33 wt % solution of triethylaluminum (29.2 kg, 84.3 mol of Al; Al/EtOH=1.0 mol/mol) in heptane was added in aliquots during 2.5 h time while keeping the temperature below 10° C. After the TEA addition, the reaction mixture was gradually heated to 80° C. over a period of 2.4 h and kept at this temperature for additional 20 min at 40 rpm. The suspension was allowed to settle for 10 min, and the mother liquor was removed through a 10 µm filter net in the bottom of the reactor during 15 min. The vessel was charged with warm toluene (43 kg) and then stirred at 40 rpm for 38 min at 55-70° C. The suspension was allowed to settle for 10 min at 50-55° C. and the liquid removed through a 10 µm filter net in the bottom of the reactor during 15 min.

Catalyst Preparation for Catalyst 2:

The vessel containing the pre-treated support material was charged with toluene (43 kg) and then cooled to approximately 30° C. Neat $TiCl_4$ (5.22 kg, 27.5 mol; Ti/Mg=1.0 mol/mol) was added. The obtained suspension was heated to approximately 90° C. over a period of 2 h and kept at this temperature for additional 1 h with stirring at 40 rpm. The suspension was allowed to settle for 10 min at approximately 90° C. and the mother liquor was removed through a 10 µm filter net in the bottom of the reactor during 15 min. The obtained solid material was washed twice with toluene (43 kg each) at =90° C. and once with heptane (34 kg) at ~40° C. All three of these washing steps used the same sequence of events: addition of preheated (90 or 40° C.) solvent, then stirring at 40 rpm for 30 min, allowing the solid to settle for 10 min, and then removal of liquid through a 10 µm filter net in the bottom of the reactor during 15 min.

The obtained catalyst was mixed with 20 kg of white oil and dried 4 h at 40-50° C. with nitrogen flow (2 kg/h) and vacuum (−1 barg). The catalyst was taken out from the reactor and reactor was flushed with another 20 kg of oil and taken out to the same drum. The dry catalyst yield was 3.74 kg (75.9% based on Mg).

Example 1

A loop reactor having a volume of 50 $dm^3$ was operated at a temperature of 70° C. and a pressure of 58 bar. Into the reactor were fed ethylene, 1-butene, propane diluent and hydrogen so that the feed rate of ethylene was 4.0 kg/h, 1-butene was 150 g/h, hydrogen was 40 g/h and propane was 48 kg/h. Also 7 g/h of a solid polymerization catalyst component produced as described above in Catalyst Preparation for Catalyst 1 was introduced into the reactor together with triethylaluminium cocatalyst so that the molar ratio of Al/Ti was about 15. The estimated production rate was 3.8 kg/h.

A stream of slurry was continuously withdrawn and directed to a loop reactor having a volume of 150 $dm^3$ and which was operated at a temperature of 95° C. and a pressure of 56 bar. Into the reactor were further fed additional ethylene, propane diluent and hydrogen so that the ethylene concentration in the fluid mixture was 1.8% by mole, the hydrogen to ethylene ratio was 840 mol/kmol and the fresh propane feed was 30 kg/h. The production rate was 11 kg/h.

A stream of slurry from the reactor was withdrawn intermittently and directed into a loop reactor having a volume of 350 $dm^3$ and which was operated at 95° C. temperature and 54 bar pressure.

Into the reactor was further added a fresh propane feed of 47 kg/h and ethylene, and hydrogen so that the ethylene content in the fluid reaction mixture was 2.6 mol-% and the molar ratio of hydrogen to ethylene was 300 mol/kmol. The ethylene polymer withdrawn from the reactor had $MFR_2$ of 180 g/10 min and density of 971 $kg/m^3$. The production rate was 30 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 80° C. Additional ethylene, 1-hexene comonomer, nitrogen as inert gas and hydrogen were added so that the ethylene content in the fluid reaction mixture was 11 mol-%, the ratio of hydrogen to ethylene was 44 mol/kmol and the molar ratio of 1-hexene to ethylene was 180 mol/kmol. The polymer production rate in the gas phase reactor was 43 kg/h and thus the total polymer withdrawal rate from the gas phase reactor was about 88 kg/h. The polymer had a melt flow rate $MFR_5$ of 2.1 g/10 min and a density of 931 $kg/m^3$. The production split (weight-% prepolymer/weight-% $1^{st}$ stage component/ weight-% $2^{nd}$ stage component/weight-% $3^{rd}$ stage component) was 4/13/34/49.

The polymer powder was mixed under nitrogen atmosphere with 500 ppm of Ca-stearate and 1200 ppm of Irganox B225. Then it was compounded and extruded under nitrogen atmosphere to pellets by using a CIMP90 extruder so that the SEI was 200 kWh/ton and the melt temperature 250° C.

Examples 2 to 4

The procedure of Example 1 was repeated except that the hydrogen feed into the prepolymerisation reactor was 20 g/h and the conditions were as shown in Table 1.

Examples 5 and 6

A loop reactor having a volume of 50 $dm^3$ was operated at a temperature of 70° C. and a pressure of 56 bar. Into the reactor were fed ethylene, 1-butene, propane diluent and hydrogen so that the feed rate of ethylene was 2.0 kg/h, 1-butene was 50 g/h, hydrogen was 2 g/h and propane was 50 kg/h. Also 15-20 g/h of a solid polymerization catalyst component produced as described above in Catalyst Preparation for Catalyst 2 was introduced into the reactor together with triethylaluminium cocatalyst so that the molar ratio of Al/Ti was about 15. The estimated production rate was 1.8 kg/h.

A stream of slurry was continuously withdrawn and directed to a loop reactor having a volume of 150 $dm^3$ and which was operated at a temperature of 95° C. and a pressure of 53 bar. Into the reactor were further fed additional ethylene, propane diluent and hydrogen. The fresh propane feed was 41 kg/h. The production rate was 17 kg/h.

A stream of slurry from the reactor was withdrawn intermittently and directed into a loop reactor having a volume of 350 $dm^3$ and which was operated at 95° C. temperature and 51 bar pressure. Into the reactor was further added a fresh propane feed of 43 kg/h and ethylene, and hydrogen. The production rate was 25 kg/h.

The slurry was withdrawn from the loop reactor intermittently and directed to a flash vessel. From there the polymer was directed to a fluidized bed gas phase reactor operated at a pressure of 20 bar and a temperature of 80° C. Additional ethylene, 1-hexene comonomer, nitrogen as inert gas and hydrogen were added. The polymer production rate in the gas phase reactor was 58 kg/h and thus the total polymer withdrawal rate from the gas phase reactor was about 100 kg/h.

Otherwise the procedure of Example 1 repeated except that the conditions were as shown in Table 1.

Example 7

A loop reactor having a volume of 50 dm$^3$ was operated at a temperature of 70° C. and a pressure of 58 bar. Into the reactor were ethylene, 1-butene, propane diluent and hydrogen so that the feed rate of ethylene was 4.0 kg/h, hydrogen was 20 g/h and propane was 48 kg/h. Also 12 g/h of a solid polymerization catalyst component produced as described above in Catalyst Preparation for Catalyst 1 was introduced into the reactor together with triethylaluminium cocatalyst so that the molar ratio of Al/Ti was about 15. The production rate was 3.8 kg/h.

A stream of slurry was continuously withdrawn and directed to a loop reactor having a volume of 150 dm$^3$ and which was operated at a temperature of 85° C. and a pressure of 56 bar. Into the reactor were further fed additional ethylene, 1-butene comonomer, propane diluent and hydrogen so that the ethylene concentration in the fluid mixture was 3.8% by mole, the hydrogen to ethylene ratio was 630 mol/kmol, the molar ratio of 1-butene to ethylene was 580 mol/kmol and the fresh propane feed was 30 kg/h. The production rate was 15 kg/h. The copolymer withdrawn from the reactor had a density of 943 kg/m$^3$ and MFR$_2$ of 410 g/10 min.

A stream of slurry from the reactor was withdrawn intermittently and directed into a loop reactor having a volume of 350 dm$^3$ and which was operated at 85° C. temperature and 54 bar pressure. Into the reactor was further added a fresh propane feed of 48 kg/h and ethylene, 1-butene and hydrogen so that the ethylene content in the fluid reaction mixture was 2.3 mol-%, the molar ratio of 1-butene to ethylene was 640 mol/kmol and the molar ratio of hydrogen to ethylene was 460 mol/kmol. The ethylene copolymer withdrawn from the reactor had MFR$_2$ of 640 g/10 min and density of 946 kg/m$^3$. The production rate was 27 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 80° C. Ethylene, 1-hexene comonomer, nitrogen as inert gas and hydrogen were added so that the ethylene content in the fluid reaction mixture was 7.1 mol-%, the ratio of hydrogen to ethylene was 29 mol/kmol and the molar ratio of 1-hexene to ethylene was 180 mol/kmol. The polymer production rate in the gas phase reactor was 48 kg/h and thus the total polymer withdrawal rate from the gas phase reactor was about 95 kg/h. The polymer had a melt flow rate MFR$_5$ of 2.3 g/10 min and a density of 919 kg/m$^3$. The production split (weight-% prepolymer/weight-% 1$^{st}$ stage component/weight-% 2$^{nd}$ stage component/weight-% 3$^{rd}$ stage component) was 4/17/28/51.

The polymer powder was mixed under nitrogen atmosphere with 500 ppm of Ca-stearate and 1200 ppm of Irganox B225. Then it was compounded and extruded under nitrogen atmosphere to pellets by using a CIMP90 extruder so that the SEI was 200 kWh/ton and the melt temperature 250° C.

Examples 8 and 9

The procedure of Example 7 was repeated except that the conditions were as shown in Table 2.

Example 10

A loop reactor having a volume of 50 dm$^3$ was operated at a temperature of 70° C. and a pressure of 56 bar. Into the reactor were ethylene, 1-butene, propane diluent and hydrogen so that the feed rate of ethylene was 2.0 kg/h, 1-butene was 50 g/h, hydrogen was 2 g/h and propane was 47 kg/h. Also 3 g/h of a solid polymerization catalyst component produced as described above in Catalyst Preparation for Catalyst 2 was introduced into the reactor together with triethylaluminium cocatalyst so that the molar ratio of Al/Ti was about 15. The production rate was 1.9 kg/h.

A stream of slurry was continuously withdrawn and directed to a loop reactor having a volume of 150 dm$^3$ and which was operated at a temperature of 85° C. and a pressure of 53 bar. Into the reactor were further fed additional ethylene, 1-butene comonomer, propane diluent and hydrogen so that the ethylene concentration in the fluid mixture was 2.9% by mole, the hydrogen to ethylene ratio was 860 mol/kmol, the molar ratio of 1-butene to ethylene was 280 mol/kmol and the fresh propane feed was 47 kg/h. The production rate was 17 kg/h. The polymer withdrawn from the reactor had a density of 952 kg/m$^3$ and MFR$_2$ of 220 g/10 min.

A stream of slurry from the reactor was withdrawn intermittently and directed into a loop reactor having a volume of 350 dm$^3$ and which was operated at 85° C. temperature and 50 bar pressure. Into the reactor was further added a fresh propane feed of 91 kg/h and ethylene, 1-butene and hydrogen so that the ethylene content in the fluid reaction mixture was 2.7 mol-%, the molar ratio of 1-butene to ethylene was 480 mol/kmol and the molar ratio of hydrogen to ethylene was 460 mol/kmol. The ethylene copolymer withdrawn from the reactor had MFR$_2$ of 140 g/10 min and density of 952 kg/m$^3$. The production rate was 24 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 80° C. Ethylene, 1-hexene comonomer, nitrogen as inert gas and hydrogen were added so that the ethylene content in the fluid reaction mixture was 11 mol-%, the ratio of hydrogen to ethylene was 54 mol/kmol and the molar ratio of 1-hexene to ethylene was 160 mol/kmol. The polymer production rate in the gas phase reactor was 52 kg/h and thus the total polymer withdrawal rate from the gas phase reactor was about 95 kg/h. The polymer had a melt flow rate MFR$_5$ of 1.3 g/10 min and a density of 923 kg/m$^3$. The production split (weight-% prepolymer/weight-% 1$^{st}$ stage component/weight-% 2$^{nd}$ stage component/weight-% 3$^{rd}$ stage component) was 2/19/25/54.

The polymer powder was mixed under nitrogen atmosphere with 500 ppm of Ca-stearate and 1200 ppm of Irganox B225. Then it was compounded and extruded under nitrogen atmosphere to pellets by using a CIMP90 extruder so that the SEI was 200 kWh/ton and the melt temperature 250° C.

Examples 11 and 12

The procedure of Example 10 was repeated except that the conditions were as shown in Table 2.

TABLE 1

Homopolymer produced in two first reactors and $C_6$ copolymer in third reactor.

| Example | 1 | 2 | 3 | 4 | 5 | 6 | C1 | C2 | C3 |
|---|---|---|---|---|---|---|---|---|---|
| Catalyst | 1 | 1 | 1 | 1 | 2 | 2 | 3 | 3 | 3 |
| Prepol, split | 4 | 4 | 4 | 4 | 2 | 2 | 2 | 2 | 2 |
| $1^{st}$ loop | | | | | | | | | |
| $H_2/C_2$ | 840 | 450 | 410 | 470 | 720 | 610 | — | — | — |
| Ethylene, mol-% | 1.8 | 3.0 | 3.1 | 3.3 | 5.1 | 6.3 | — | — | — |
| $MFR_2$, g/10 min | 860 | 190 | 140 | 170 | 144 | 128 | — | — | — |
| Split | 13 | 12 | 12 | 11 | 18 | 16 | — | — | — |
| $2^{nd}$ loop | | | | | | | | | |
| $H_2/C_2$ | 300 | 320 | 310 | 370 | 600 | 540 | 160 | 160 | 150 |
| Ethylene, mol-% | 2.6 | 3.9 | 4.0 | 4.9 | 3 | 3.7 | 4.4 | 4.4 | 4.7 |
| $MFR_2$, g/10 min | 180 | 130 | 110 | 160 | 510 | 310 | 50 | 50 | 43 |
| Density, kg/m³ | 971 | 970 | 970 | 971 | — | — | 969 | 969 | 968 |
| Split | 34 | 32 | 32 | 28 | 24 | 25 | 39 | 39 | 40 |
| GPR | | | | | | | | | |
| $H_2/C_2$ | 44 | 33 | 33 | 33 | 70 | 67 | 0 | 0 | 16 |
| $C_6/C_2$ | 180 | 160 | 160 | 150 | 75 | 85 | 170 | 160 | 200 |
| Ethylene, mol-% | 11 | 7.6 | 7.2 | 8.0 | 5.4 | 5.6 | 7.0 | 7.0 | 9.2 |
| Split | 49 | 51 | 51 | 58 | 56 | 57 | 59 | 59 | 58 |
| PE Extruder SEI (calculated, kwh/t) | 200 | 190 | 190 | 220 | 150 | 150 | 230 | 250 | 220 |
| Pellet $MFR_5$, g/10 min | 2.1 | 2.1 | 1.8 | 1.1 | 1.9 | 1.8 | 1.5 | 1.4 | 3.3 |
| Pellet $MFR_{21}$, g/10 min | 56 | 49 | 42 | 25 | 51 | 47 | 29 | 27 | 56 |
| Pellet Density, kg/m³ | 931 | 927 | 929 | 927 | 933 | 934 | 927 | 930 | 930 |
| C6 content by NMR, wt % | — | 9.7 | 8.3 | 8.3 | 7.4 | 7.0 | — | 7.5 | 8.5 |
| DDI 20 μm film, g | — | 125 | 119 | 108 | 39 | 41 | — | — | — |
| DDI 40 μm film, g | — | 700 | 546 | 1317 | 290 | 276 | — | 320 | 205 |

TABLE 2

$C_4$ copolymer produced in two first reactors and $C_6$ copolymer in third reactor.

| Example | 7 | 8 | 9 | 10 | 11 | 12 | C4 | C5 | C6 |
|---|---|---|---|---|---|---|---|---|---|
| Catalyst | 1 | 1 | 1 | 2 | 2 | 2 | 3 | 3 | 3 |
| Prepol, split | 4 | 4 | 3 | 2 | 2 | 2 | 2 | 2 | 2 |
| $1^{st}$ loop | | | | | | | | | |
| $H_2/C_2$ | 630 | 530 | 370 | 860 | 640 | 600 | 300 | 280 | 310 |
| $C_4/C_2$ | 580 | 350 | 190 | 280 | 370 | 320 | 380 | 530 | 340 |
| Ethylene, mol-% | 3.8 | 5.2 | 7.3 | 2.9 | 3.7 | 4.6 | 4.6 | 2.9 | 4.9 |
| $MFR_2$, g/10 min | 410 | — | 67 | 220 | 360 | 170 | — | 340 | 225 |
| Density, kg/m³ | 943 | — | 951 | 952 | 952 | 949 | — | 946 | 952 |
| Split | 17 | 16 | 19 | 19 | 19 | 19 | 16 | 16 | 17 |
| $2^{nd}$ loop | | | | | | | | | |
| $H_2/C_2$ | 460 | 410 | 420 | 460 | 490 | 460 | 250 | 270 | 300 |
| $C_4/C_2$ | 640 | 460 | 570 | 480 | 550 | 410 | 680 | 550 | 660 |
| Ethylene, mol-% | 2.3 | 2.8 | 2.9 | 2.7 | 2.4 | 3.4 | 4.4 | 2.8 | 4.6 |
| $MFR_2$, g/10 min | 640 | — | 230 | 140 | 300 | 240 | 320 | 134 | 240 |
| Density, kg/m³ | 946 | — | 951 | 952 | 951 | 953 | 949 | 950 | 951 |
| Split | 28 | 29 | 21 | 25 | 25 | 25 | 26 | 25 | 25 |
| GPR | | | | | | | | | |
| Temperature, °C | 80 | 80 | 85 | 85 | 85 | 85 | 85 | 80 | 85 |
| $H_2/C_2$ | 29 | 27 | 62 | 54 | 62 | 55 | 2 | 8 | 6 |
| $C_6/C_2$ | 180 | 170 | 210 | 160 | 155 | 155 | 320 | 320 | 295 |
| Ethylene, mol-% | 7.1 | 8 | 13 | 11 | 10 | 11 | 15 | 30 | 26 |
| Dew point in GPR, °C | 48.9 | 49.3 | 57 | 51.1 | 49.9 | 50.7 | 67.9 | 83.6 | 77.6 |
| Split | 51 | 51 | 57 | 54 | 54 | 54 | 56 | 57 | 56 |
| PE Extruder SEI (calculated, kwh/t) | 200 | 200 | 210 | 150 | 155 | 155 | 190 | 200 | 220 |
| Pellet $MFR_5$, g/10 min | 2.3 | 2.0 | 1.2 | 1.3 | 1.8 | 1.6 | 1.6 | 1.1 | 1.0 |
| Pellet $MFR_{21}$, g/10 min | 78 | 59 | 28 | 34 | 47 | 30 | 40 | 29 | 26 |
| Pellet Density, kg/m³ | 919 | 921 | 921 | 923 | 922 | 925 | 919 | 925 | 922 |
| C4 content by NMR, wt % | 1.3 | — | — | 0.9 | 0.9 | 0.8 | — | — | 0.9 |
| C6 content by NMR, wt % | 10.3 | — | — | 8.7 | 9.3 | 8.5 | — | — | 7.8 |
| DDI 20 μm film | — | 161 | 150 | 144 | 128 | 109 | — | — | 137 |
| DDI 40 μm film | — | 1117 | 1284 | 1146 | 871 | 865 | — | — | 1556 |

The polymers were extruded into films in a blown film line in similar conditions.

The dew point temperature in the gas phase reactor was calculated from the composition of the gas mixture by using the Kwong-Redlich-Soave equation of state.

COMPARATIVE EXAMPLES

Catalyst Preparation for Catalyst 3
Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 litres pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl$_4$ was added during 0.5 hours at 45° C. The slurry was stirred at 40° C. for five hours. The catalyst was then dried by purging with nitrogen.

Comparative Example 1

A loop reactor having a volume of 50 dm$^3$ was operated at a temperature of 70° C. and a pressure of 61 bar. Into the reactor were ethylene, propane diluent and hydrogen so that the feed rate of ethylene was 2.0 kg/h, hydrogen was 5.4 g/h and propane was 47 kg/h. Also 11 g/h of a solid polymerization catalyst component produced as described above in solid catalyst component preparation was introduced into the reactor together with triethylaluminium cocatalyst so that the molar ratio of Al/Ti was about 15. The estimated production rate was 1.9 kg/h.

A stream of slurry from the reactor was withdrawn intermittently and directed into a loop reactor having a volume of 350 dm$^3$ and which was operated at 85° C. temperature and 57 bar pressure. Into the reactor was further added a fresh propane feed of 42 kg/h and ethylene and hydrogen so that the ethylene content in the fluid reaction mixture was 4.4 mol-% and the molar ratio of hydrogen to ethylene was 160 mol/kmol. No comonomer was fed to the 350 dm$^3$ loop reactor. The production rate was 35 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 85° C. Ethylene, 1-hexene comonomer, nitrogen as inert gas and hydrogen were added so that the ethylene content in the fluid reaction mixture was 7.4 mol-%, the ratio of hydrogen to ethylene was 0.2 mol/kmol and the molar ratio of 1-hexene to ethylene was 170 mol/kmol. The polymer production rate in the gas phase reactor was 53 kg/h and thus the total polymer withdrawal rate from the gas phase reactor was about 90 kg/h. The polymer had a melt flow rate MFR$_5$ of 1.5 g/10 min and a density of 927 kg/m$^3$. The production split (weight-% prepolymer/weight-% 1$^{st}$ stage component/weight-% 2$^{nd}$ stage component/) was 2/39/59.

The polymer powder was mixed under nitrogen atmosphere with 1500 ppm of Ca-stearate and 2200 ppm of Irganox B225. Then it was compounded and extruded under nitrogen atmosphere to pellets by using a CIMP90 extruder so that the SEI was 233 kWh/ton and the melt temperature 262° C.

Comparative Example 2 and 3

The procedure of Comparative Example 1 was repeated except that the conditions were as shown in Table 1.

Comparative Example 4

A loop reactor having a volume of 50 dm$^3$ was operated at a temperature of 70° C. and a pressure of 63 bar. Into the reactor were ethylene, 1-butene, propane diluent and hydrogen so that the feed rate of ethylene was 2.0 kg/h, 1-butene was 150 g/h, hydrogen was 4.7 g/h and propane was 51 kg/h. Also 9 g/h of a solid polymerization catalyst component produced as described above in solid catalyst component preparation for Catalyst 3 was introduced into the reactor together with triethylaluminium cocatalyst so that the molar ratio of Al/Ti was about 15. The estimated production rate was 1.9 kg/h.

A stream of slurry was continuously withdrawn and directed to a loop reactor having a volume of 150 dm$^3$ and which was operated at a temperature of 85° C. and a pressure of 60 bar. Into the reactor were further fed additional ethylene, 1-butene comonomer, propane diluent and hydrogen so that the ethylene concentration in the fluid mixture was 4.6% by mole, the hydrogen to ethylene ratio was 300 mol/kmol, the molar ratio of 1-butene to ethylene was 380 mol/kmol and the fresh propane feed was 33 kg/h. The production rate was 15 kg/h.

A stream of slurry from the reactor was withdrawn intermittently and directed into a loop reactor having a volume of 350 dm$^3$ and which was operated at 85° C. temperature and 54 bar pressure. Into the reactor was further added a fresh propane feed of 49 kg/h and ethylene, 1-butene and hydrogen so that the ethylene content in the fluid reaction mixture was 4.4 mol-%, the molar ratio of 1-butene to ethylene was 680 mol/kmol and the molar ratio of hydrogen to ethylene was 250 mol/kmol. The ethylene copolymer withdrawn from the reactor had MFR$_2$ of 320 g/10 min and density of 949 kg/m$^3$. The production rate was 26 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 85° C. Ethylene, 1-hexene comonomer, nitrogen as inert gas and hydrogen were added so that the ethylene content in the fluid reaction mixture was 15 mol-%, the ratio of hydrogen to ethylene was 2 mol/kmol and the molar ratio of 1-hexene to ethylene was 320 mol/kmol. The polymer production rate in the gas phase reactor was 55 kg/h and thus the total polymer withdrawal rate from the gas phase reactor was about 98 kg/h. The polymer had a melt flow rate MFR$_5$ of 1.6 g/10 min and a density of 919 kg/m$^3$. The production split (weight-% prepolymer/weight-% 1$^{st}$ stage component/weight-% 2$^{nd}$ stage component/weight-% 3$^{rd}$ stage component) was 2/16/26/56.

The polymer powder was mixed under nitrogen atmosphere with 1500 ppm of Ca-stearate and 2200 ppm of Irganox B225. Then it was compounded and extruded under nitrogen atmosphere to pellets by using a CIMP90 extruder so that the SEI was 190 kWh/ton and the melt temperature 225° C.

Comparative Examples 5 and 6

The procedure of Comparative Example 4 was repeated except that the conditions were as shown in Table 2.

It can be seen by comparing Example 12 with Comparative Example 5 that with the process according to the present invention the gas phase reactor can be operated with a lower amount of comonomer ($C_6/C_2$ of 155 mol/kmol) than the prior art process ($C_6/C_2$ of 320 mol/kmol) when producing the same polymer. A similar comparison can be made between Example 9 and Comparative Example 6.

From Table 2 it can be seen that the dew point of 1-hexene in gas phase is substantially lower with Examples 7-12 than with Comparative Examples $C_4$-$C_6$. In the prior art process operability in gas phase reactor is worse i.e. sheeting and chunking is occurring. When operating gas phase reactor at 85° C., it is preferred to have a dew point temperature of not more than 70° C., more preferably not more than 65° C. For Comparative examples with only C4 the dew point temperature is below 70° C. but it would not be possible to operate in plant scale in such conditions since $H_2/C_2$ 2 mol/kmol is not possible at a $C_2$ concentration of 15 mol-%.

It can also be seen, for instance, by comparing Example 4 and 5 with Comparative Example 3 or comparing Example 9 and 10 with Comparative Example 6 that the Comparative Examples operate at the limit of the performance of the catalyst. The $H_2/C_2$ ratio is very small in the gas phase reactor and it is not possible to increase the molecular weight anymore by reducing the amount of hydrogen. However, the Examples operate at greater $H_2/C_2$ ratios and still produce the same $MFR_{21}$, thus making it possible to reduce the amount of hydrogen. It is thus possible to achieve higher molecular weight (or lower MFR) with the process according the present invention. In plant scale it is not possible to operate totally without hydrogen in the gas phase because there's always some hydrogen in the circulation gas.

DDI values are similar or even better with the process according to the present invention compared to prior art. From Table 1 it can be seen that in case with homopolymer in the first reactor, higher dart drop values are achieved with similar density and MFR. Table 2 shows that in case of $C_4$ copolymer in the first reactor, similar DDI values are reached with similar density and MFR.

The invention claimed is:

1. A process for producing copolymers of ethylene and at least one alpha-olefin having from 4 to 10 carbon atoms in the presence of a solid Ziegler-Natta catalyst comprising of magnesium, titanium, halogen and an internal organic compound, the copolymer having a density of from 906 to 937 kg/m³ and a melt flow rate $MFR_{21}$ measured at 190° C. under 21.6 kg load of from 3 to 150 g/10 min comprising the steps of:
   (A) homopolymerising ethylene or copolymerising ethylene and a first alpha-olefin having from 4 to 10 carbon atoms in a first polymerisation stage in the presence of the polymerisation catalyst, hydrogen and optionally the first alpha-olefin wherein the molar ratio of hydrogen to ethylene in the fluid reaction mixture of the first polymerisation stage is from 200 to 50000 mol/kmol and the molar ratio of the first alpha-olefin to ethylene in the fluid reaction mixture of the first polymerisation stage is from 0 to 1500 mol/kmol, to produce a first homo- or copolymer of ethylene;
   (B) copolymerising ethylene and a second alpha-olefin having from 4 to 10 carbon atoms in a second polymerisation stage in the presence of the first homo- or copolymer of ethylene and the solid Ziegler-Natta catalyst to produce a polymer mixture comprising the first homo- or copolymer of ethylene and a second copolymer of ethylene, the polymer mixture having a density of from 906 to 937 kg/m³ and a melt flow rate $MFR_{21}$ of from 3 to 150 g/10 min;
   (C) recovering the polymer mixture, characterised in that the polymerisation catalyst comprises an internal organic compound having the formula (I):

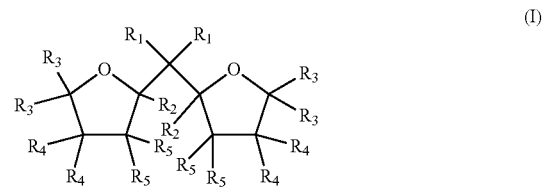

wherein in the formula (I) $R_1$ to $R_5$ are the same or different and can be are hydrogen, a linear or branched C1 to C8-alkyl group, or a C3-C8-alkylene group, or two or more of $R_1$ to $R_5$ optionally forms a ring, and the two oxygen-containing rings are individually saturated or partially unsaturated or unsaturated.

2. The process according to claim 1, further comprising preparing the solid Ziegler-Natta catalyst component by the additional steps of:
   (a) providing solid carrier particles of $MgCl_2 \cdot mROH$ adduct;
   (b) pre-treating the solid carrier particles of step (a) with a compound of Group 13 metal;
   (c) treating the pre-treated solid carrier particles of step (b) with a transition metal compound of Group 4 to 6;
   (d) recovering the solid catalyst component;
   (e) contacting the solid carrier particles with the internal organic compound compound having the formula (I) prior to the step (c); and
   (f) passing the solid Ziegler-Natta catalyst component into the first polymerisation stage (A), wherein R in the adduct $MgCl_2 \cdot mROH$ is a linear or branched alkyl group with 1 to 12 carbon atoms and m is a number from 0 to 6.

3. The process according to claim 1 wherein the hydrogen to ethylene ratio in the fluid reaction phase of the first polymerisation stage is from 200 to 1000 mol/kmol.

4. The process according to claim 1 wherein the first homo- or copolymer of ethylene is a homopolymer of ethylene and no comonomer is present in the first polymerisation stage.

5. The process according to claim 1 wherein the first homo- or copolymer of ethylene is a copolymer of ethylene.

6. The process according to claim 5 wherein the first alpha-olefin is selected from the group consisting of 1-butene, 1-hexene and 4-methyl-1-pentene.

7. The process according to claim 6 wherein the molar ratio of the first alpha-olefin to ethylene in the fluid reaction mixture of the first polymerisation stage is from 200 to 1000 mol/kmol.

8. The process according to claim 1 wherein the polymer mixture has a melt flow rate $MFR_{21}$ of from 20 to 150 g/10 min; or a density of from 910 to 932 kg/m$^3$; or a melt flow rate $MFR_{21}$ of from 20 to 150 g/10 min and a density of from 910 to 932 kg/m$^3$.

9. The process according claim 1 wherein the hydrogen to ethylene ratio in the fluid reaction mixture of the second polymerisation stage is from 10 to 150 mol/kmol.

10. The process according to claim 9 wherein the molar ratio of hydrogen to ethylene in the fluid reaction mixture of the second polymerisation stage is from 20 to 100 mol/kmol.

11. The process according to claim 1 wherein the second alpha-olefin having from 4 to 10 carbon atoms is selected from the group consisting of 1-butene, 1-hexene, 4-methyl-1-pentene, 1-octene and mixtures thereof.

12. The process according to claim 11 wherein the molar ratio of the second alpha-olefin to ethylene in the fluid reaction mixture of the second polymerisation stage is from 50 to 400 mol/kmol.

13. The process according to claim 8 wherein the polymer mixture comprises from 35 to 57% by weight of the first polymer and from 43 to 65% by weight of the second copolymer.

14. The process according to claim 1 wherein the first polymerisation stage is conducted as a slurry polymerisation in a loop reactor; or the second polymerisation stage is conducted as a gas phase polymerisation in a fluidised bed; or the first polymerisation stage is conducted as a slurry polymerisation in a loop reactor and the second polymerisation stage is conducted as a gas phase polymerisation in a fluidised bed.

15. The process according to claim 14 wherein the dew point temperature of the gas mixture in the second polymerisation stage is not more than 65° C.

* * * * *